US 6,559,492 B1

United States Patent
Hazucha et al.

(10) Patent No.: US 6,559,492 B1
(45) Date of Patent: May 6, 2003

(54) ON-DIE SWITCHING POWER CONVERTER WITH STEPPED SWITCH DRIVERS AND METHOD

(75) Inventors: Peter Hazucha, Beaverton, OR (US); Atila Alvandpour, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/010,705

(22) Filed: Nov. 7, 2001

(51) Int. Cl.[7] .............................................. H01L 27/108
(52) U.S. Cl. ......................... 257/299; 257/691; 363/16; 363/123; 363/131
(58) Field of Search .............................. 257/299, 691; 363/16, 123, 131

(56) References Cited

U.S. PATENT DOCUMENTS 6,057,607 A * 5/2000 Rader et al. ................. 307/711
6,094,038 A * 7/2000 Lethellier .................... 323/271
6,222,745 B1 * 4/2001 Amaro et al. ................ 323/285
6,330,169 B2 * 12/2001 Mullett et al. ................. 363/16
6,396,137 B1 * 5/2002 Klughart ...................... 257/691

\* cited by examiner

*Primary Examiner*—David Nelms
*Assistant Examiner*—Tu-Tu Ho
(74) *Attorney, Agent, or Firm*—Schwegman, Lundberg, Woessner & Kluth, P.A.

(57) ABSTRACT

A DC-to-DC switching power converter includes switching elements having capacitive gate control inputs, an energy storage element and driver circuitry. Improved efficiency is achieved using adiabatic buffers to drive MOSFET switching elements with stepped switching signals. Substantially equal rise and fall times are achieved. In one embodiment, the switching power converter is fabricated on a semiconductor die to generate an output voltage to one or more functional unit blocks on the die.

23 Claims, 6 Drawing Sheets

ON-DIE SWITCHING POWER CONVERTER WITH STEPPED SWITCH DRIVERS AND METHOD

FIELD OF THE INVENTION

The present invention pertains to DC-to-DC switching power converters, and in particular to DC-to-DC switching power converters fabricated on semiconductor die.

BACKGROUND OF THE INVENTION

DC-to-DC switching power converters are commonly used to convert one available DC voltage to another DC voltage, often needed for semiconductor die. Such power converters may use one or more electrically controlled switches, such as N-channel or P-channel MOSFET devices. As electronic devices become faster, smaller and more portable, the need for improved electrical efficiency in DC-to-DC converters is becoming more important. Improved electrical efficiency of power converters results in greater overall efficiency of electronic systems, such as microprocessors.

As the operating voltage of microprocessors is reduced, semiconductor die can be operated at higher frequencies and the number of transistors integrated on a single semiconductor die can be increased. Accordingly, the semiconductor die consumes more power from a power supply. The supply paths carrying current to a semiconductor die through a circuit board must carry proportionally more current as the voltage level decreases. As a result, the parasitic elements of the current path to a semiconductor die become more pronounced. For example, narrower track widths along with increased current increase series resistance and inductance increasing ripple, power loss and voltage drop. Furthermore, increasing current requires a greater number of package pins and circuit pads for a die which reduces interconnect reliability.

Switching transistors, such as N-channel and P-channel MOSFET devices, for example, which may be used in power converters, have a capacitive gate control input and are turned on by charging the gate capacitance to an appropriate voltage and are turned off by discharging the gate capacitance. Driver circuitry, such as inverting buffers, is inefficient in charging and discharging the gate capacitance, especially when operated at higher frequencies.

Thus there is a general need for an improved power converter suitable for use on semiconductor die. There is also a need for a more efficient power converter that achieves greater efficiency by reducing the amount of energy to charge and discharge the gate capacitance of switching elements that have capacitive gate control inputs. There is also a need for an on-die power converter that reduces the requirements of off-die voltage regulation modules.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

DETAILED DESCRIPTION

The description set out herein illustrates the various embodiments of the invention and such description is not intended to be construed as limiting in any manner. The present invention is related to DC-to-DC switching power converters, and in one aspect, relates to DC-to-DC switching power converters fabricated on semiconductor die. In one aspect, a more efficient power converter achieves greater efficiency by reducing the amount of energy to charge and discharge the gate capacitance of switching elements that have capacitive gate control inputs. In another aspect, an on-die power converter reduces the requirements of off-die voltage regulation modules. Adiabatic buffers generate stepped switching signals to at least one of the switching elements of a power converter. In one embodiment, back-to-back coupled MOSFETs help generate substantially equal rise and fall times of the stepped switching signals to further improve the efficiency of a power converter. The present invention also relates to improved adiabatic buffers that achieve substantially equal rise and fall times.

Figure 1:
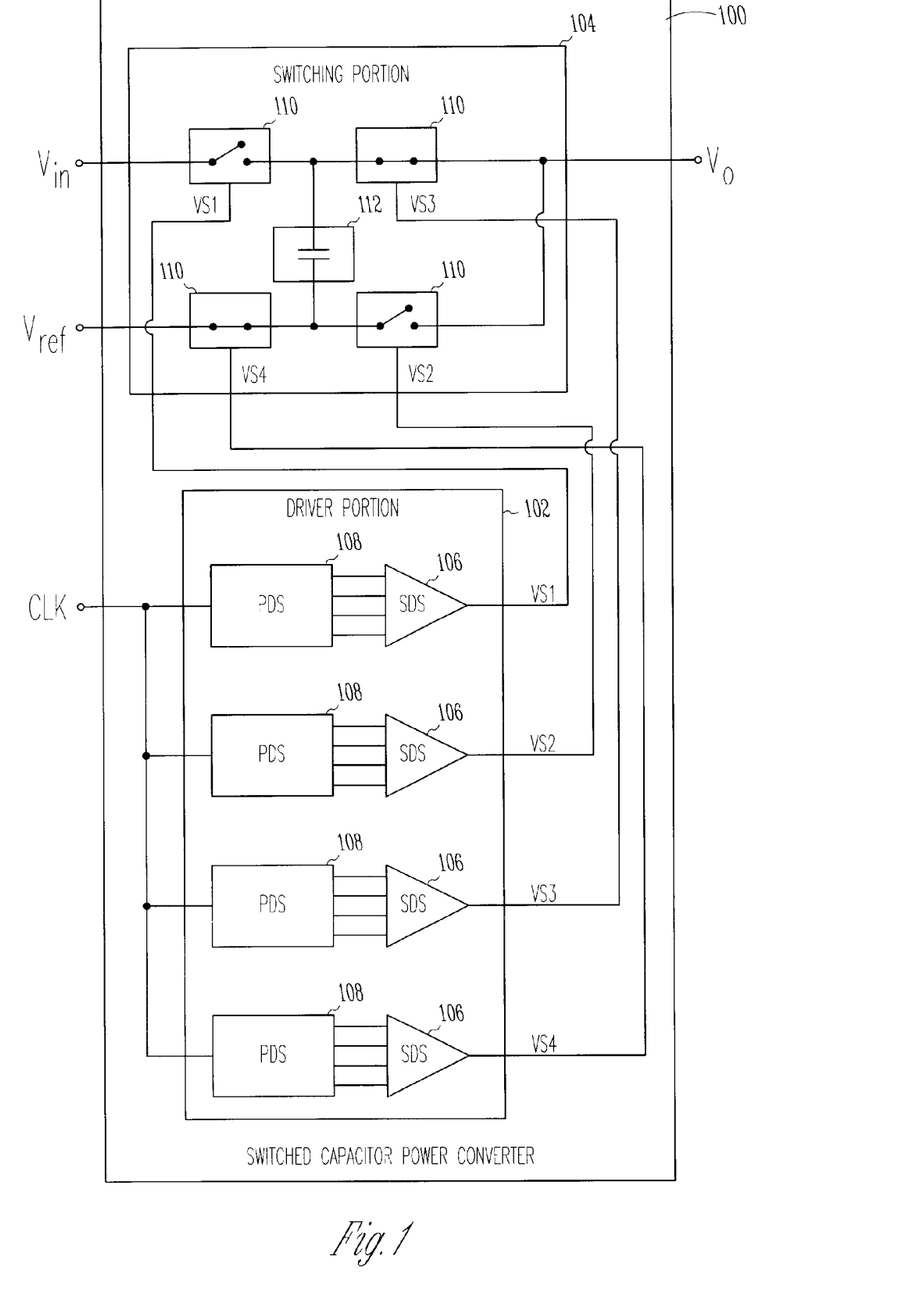
FIG. 1 is a simplified functional block diagram of a switched-capacitor power converter in accordance with an embodiment of the present invention.

FIG. 1 is a simplified functional block diagram of a switched-capacitor power converter in accordance with an embodiment of the present invention. Power converter 100 may be fabricated on a semiconductor die to supply power to one or more functional unit blocks on the semiconductor die. Power converter 100 generates output voltage (Vo) from input voltage (Vin) in reference to reference voltage (Vref). Vo is positive with respect to Vref, which may be a ground potential. Vo is desirably less than Vin, although this is not a requirement. Vo may also be greater than Vin. Power converter 100 includes driver portion 102 and switching portion 104. Driver portion 102 generates stepped switching signals (Vs1, Vs2, Vs3 and Vs4) for switching portion 104. Switching portion generates Vo in response to the stepped switching signals. Driver portion 102 includes step driver stages (SDS) 106 which may generate a stepped switching signal for one of switching elements 110 of switching portion 104. Switching elements 110 turn on (i.e., conduct) or turn off in response to the stepped switching signals. Although only one signal per switching element is illustrated, several signals per switching element may be utilized. Additionally, more than one switching element may be driven by a single switching signal. Predriver stages (PDS) 108 may generate stepped voltages and control signals for the step driver stages 106 utilizing, for example, a clock signal (CLK), Vin and Vref. Switching elements 110 may be field effect transistors such as MOSFETS.

Switching portion 104 also includes energy storage element 112 which stores and delivers energy in response to the switching action of switching elements 110. Energy storage element 112 is illustrated as a capacitive energy storage element and power converter 100 is illustrated with four switching elements 112, however, the present invention is not limited to this configuration and includes switching portions utilizing more than four or less than four switching elements. The embodiments of the present invention include capacitive as well as inductive storage elements.

Figure 2:
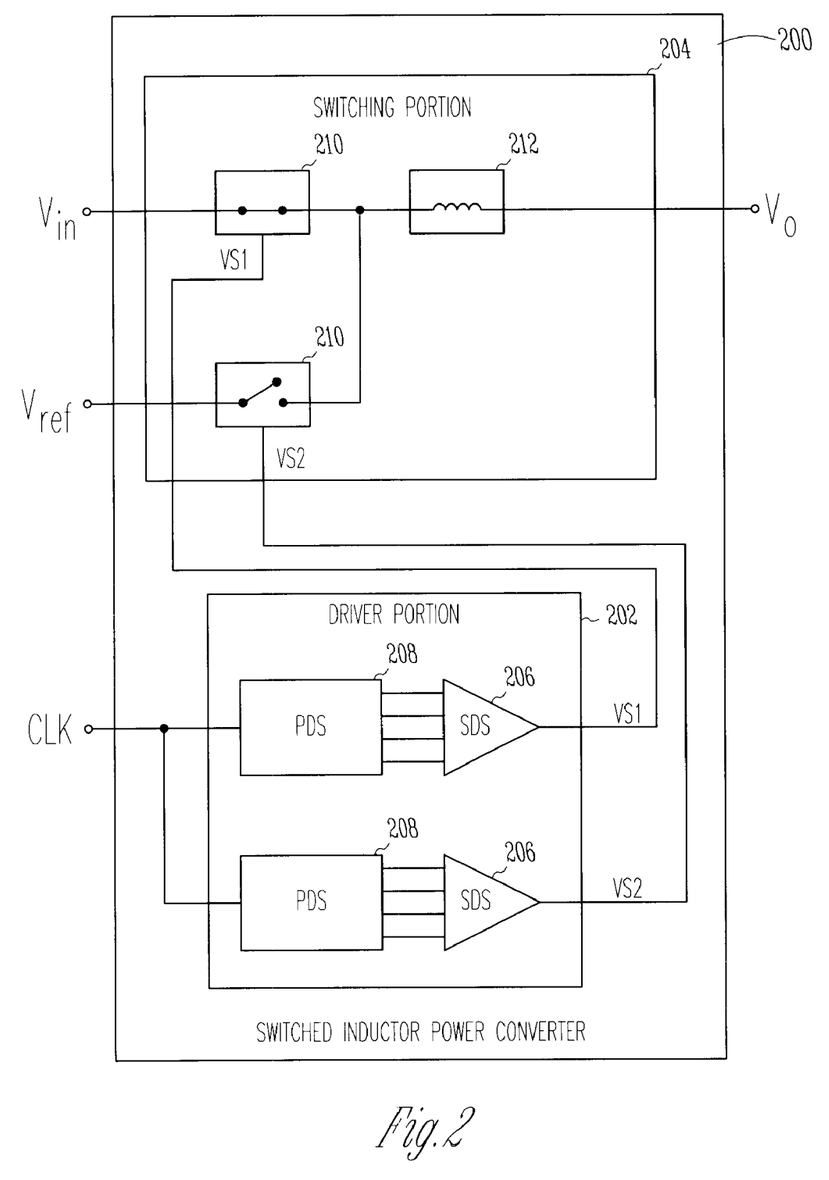
FIG. 2 is a simplified functional block diagram of a switched-inductor power converter in accordance with an embodiment of the present invention.

FIG. 2 is a simplified functional block diagram of a switched-inductor power converter in accordance with an embodiment of the present invention. Power converter 200 is similar to power converter 100 (FIG. 1) except that switching portion 204 operates as a switched-inductor power converter utilizing an inductive energy storage element for element 212. In this embodiment, only two switching elements 210 are illustrated which receive stepped switching signals from corresponding step driver stages 206 of driver portion 202. Predriver stages 208 generate control signals and stepped voltages for step driver stage 206 based on clock signal (CLK), Vin and Vref.

Figure 3:
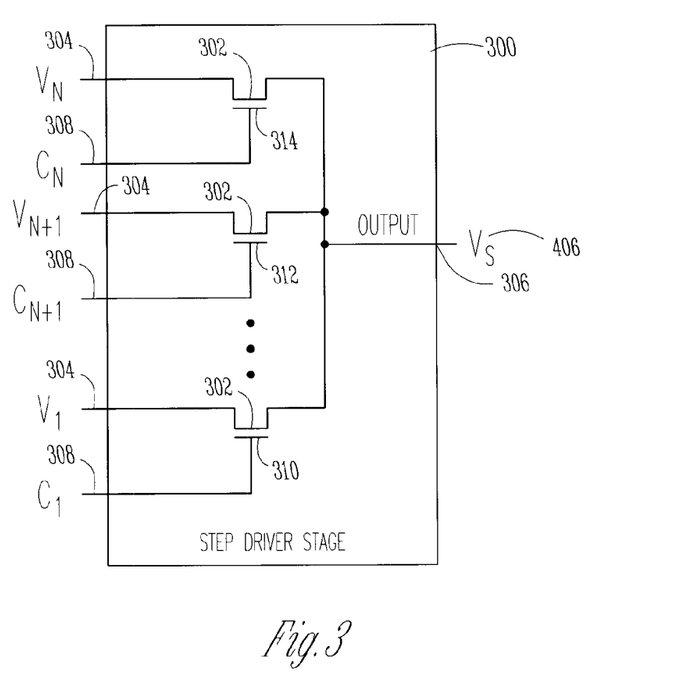
FIG. 3 is a simplified functional block diagram of a step driver stage in accordance with an embodiment of the present invention.
Figure 4:
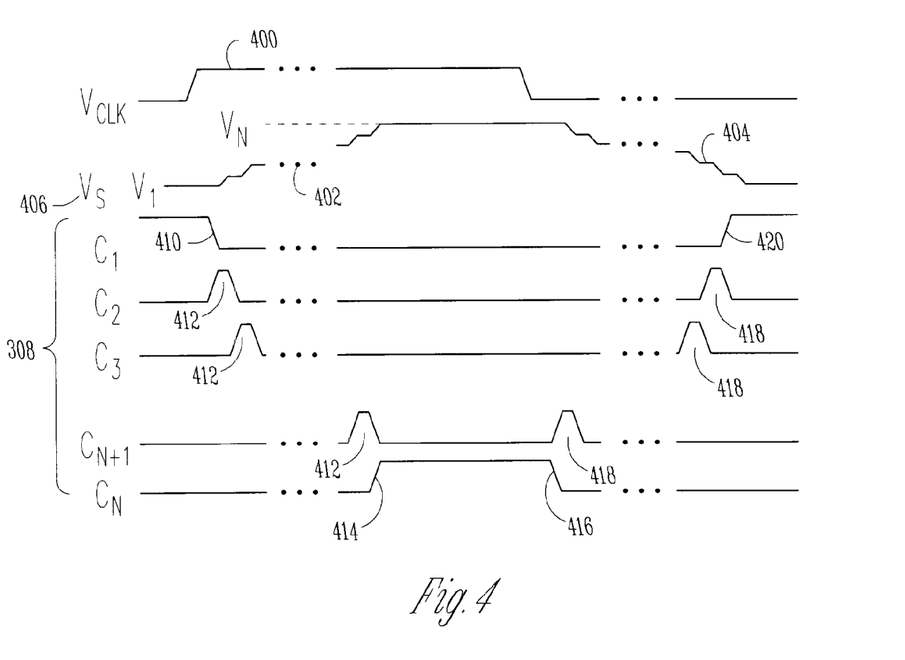
FIG. 4 illustrates signals for the step driver stage of FIG. 3.

FIG. 3 is a simplified functional block diagram of a step driver stage in accordance with an embodiment of the present invention. FIG. 4 illustrates signals for the step driver stage of FIG. 3. Step driver stage 300 is suitable for use as one of step driver stages 106 (FIG. 1) or as one of step driver stages 206 (FIG. 2). Step driver stage 300 may generate a stepped switching signal for one or more of the switching elements of a power converter. Step driver stage 300 may be comprised of several step-driver switching elements 302 arranged to sequentially couple one of several input stepped voltages 304 (illustrated as V1 through VN) to step driver stage output 306 generating the stepped output signal Vs. Control signals 308 (illustrated as C1 through CN) turn on and off switching elements 302. A predriver stage, such as predriver stage 108 (FIG. 1) or predriver stage 208 (FIG. 2) may generate control signals 308 and stepped voltages 304. Stepped voltages 304 may range from Vref to Vin. N may be any whole number greater than two and may be as high as ten or more. Step driver stage 300 may be referred to as an adiabatic buffer which perform adiabatic charging (i.e., charging in steps).

To generate upward transition 402 of stepped switching signal 306 (i.e., from V1 to VN), control signal C1 turns off switching element 310 at transition 410, control signals C2 through CN-1 sequentially turn on each of corresponding switching elements 312 at times 412, and then control signal CN turns on switching element 314 at transition 414. To generate downward transition 404 of stepped switching signal 306 (i.e., from VN to V1), control signal CN turns off switching element 314 at transition 416, control signals CN-1 through C2 sequentially turn on each of corresponding switching elements 312 at times 418, and control signal C1 turns on switching element 310 at transition 420. In the example illustrated, downward transition 410 of control signal C1 and downward transition 416 of control signal CN may be responsive to the transitions of clock signal 400. Switching elements 302 are illustrated in FIG. 3 as N-channel MOSFETS although other switching elements, including P-channel MOSFETS may also be suitable. Control signals C1 through CN are desirably inverted prior to coupling to the gates of a P-channel MOSFET because a P-channel MOSFET conducts when negative voltage is applied at its gate while an N-channel MOSFET conducts when positive voltage is applied to its gate.

Figure 5:
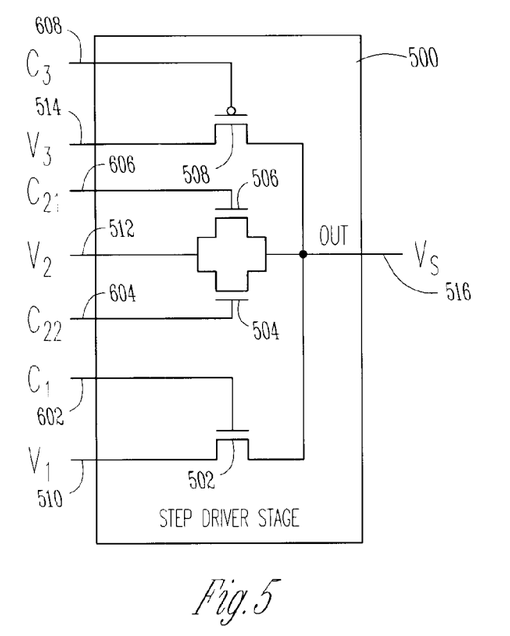
FIG. 5 is a simplified functional block diagram of a step driver stage in accordance with another embodiment of the present invention.
Figure 6:
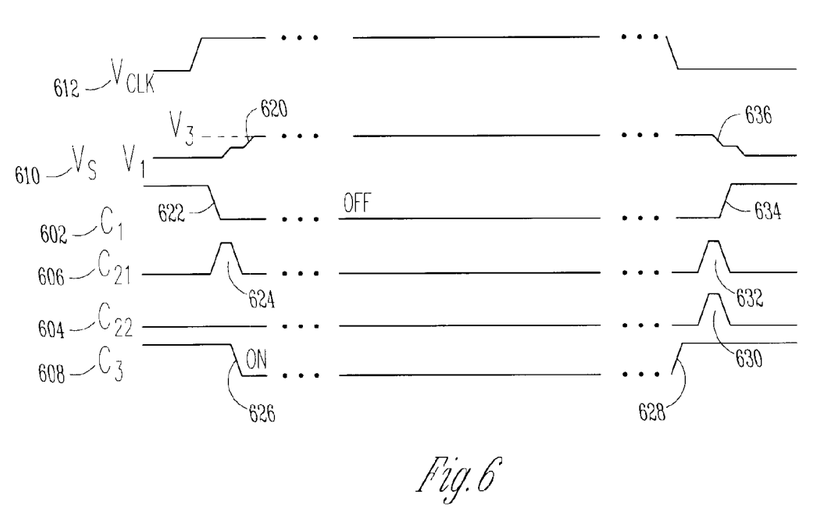
FIG. 6 illustrates signals for the step driver stage of FIG. 5.

FIG. 5 is a simplified functional block diagram of a step driver stage in accordance with another embodiment of the present invention. FIG. 6 illustrates signals for the step driver stage of FIG. 5. Step driver stage 500 is suitable for use as one of step driver stages 106 (FIG. 1) or as one of step driver stages 206 (FIG. 2). Step driver stage 500 may generate a stepped switching signal for one or more of the switching elements of a power converter. Step driver stage 500 may be comprised of several step-driver switching elements 502, 504, 506 and 508 arranged to sequentially couple one of several stepped voltages 510, 512 and 514 to step driver stage output 516 generating stepped output signal Vs. Control signals 602, 604, 606 and 608 (illustrated respectively as C1, C22, C21 and C3) turn on and off corresponding switching elements 502, 504, 506 and 508. A predriver stage, such as predriver stage 108 (FIG. 1) or predriver stage 208 (FIG. 2) may generate the control signals and the stepped voltages. Stepped voltages 510, 512 and 514 may range from Vref to Vin. Step driver stage 500 may be referred to as an adiabatic buffer.

To generate upward transition 620 of stepped switching signal 610 (i.e., from V1 to V3), control signal 602 (C1) turns off switching element 502 at transition 622, control signal 606 (C21) turns on switching element 506 at time 624, and control signal 608 (C3) turns on switching element 508 at transition 626. To generate downward transition 636 of stepped switching signal 610 (i.e., from V3 to V1), control signal 608 (C3) turns off switching element 508 at transition 628, control signals 604 (C22) and 606 (C21) substantially simultaneously turn on each of corresponding switching elements 504 and 506 during times 630 and 632 respectively, and then control signal 602 (C1) turns on switching element 502 at transition 634. In the example illustrated, downward transition 622 of control signal 602 and upward transition 628 of control signal 608 may be responsive to the transitions of clock signal 612.

In the embodiment illustrated in FIG. 5, switching element 502, 504 and 506 may be N-channel MOSFETs, and switching element 508 may be a P-channel MOSFET, however other combinations of N-channel and P-channel MOSFETs may also be suitable. Other types of switching transistors may be suitable for use as the switching elements.

For N-channel MOSFETs, a rising transition of Vs is faster compared to a falling transition of Vs due to the larger gate-to-source bias. For P-channel MOSFETs, a falling transition of Vs is faster compared to the rising transition of Vs due to the smaller gate-to-source bias. Switching elements 504 and 506 together comprise a transition gate and operate to help equalize the rise and fall times of stepped switching signal 610. In this embodiment, switching elements 504 and 506 may be both N-channel MOSFETS. To help equalize the rise and fall times, switching element 506 is turned on during both the rising and falling transition of stepped switching signal 610. Because the falling transition is the slower one, switching element 504 may be turned on only during the falling transition to help equalize the rise and fall times. Step driver stage 500 may include additional switching elements and may include additional transition gates for generating additional steps for the upward and downward transitions of switching signal 610. Although switching elements 504 and 506 are coupled back-to-back similar to a transmission gate, switching elements 504 and 506 do not comprise a transmission gate because the gates are not controlled by inverse signals.

In an alternate embodiment, switching elements 504 and 506 may both be P-channel MOSFETs. In this embodiment, the rising transition is slower and therefore switching element 504 is turned on during both the rising and falling transitions of stepped switching signal 610, while switching element 506 may be turned on only during the rising transition. Accordingly, the rise and fall times are substantially equalized without an excessive power penalty. P-channel MOSFETs are desirable for coupling Vs to larger of the stepped voltages, while N-channel MOSFETs are desirable for coupling Vs to smaller of the stepped voltages.

Figure 7:
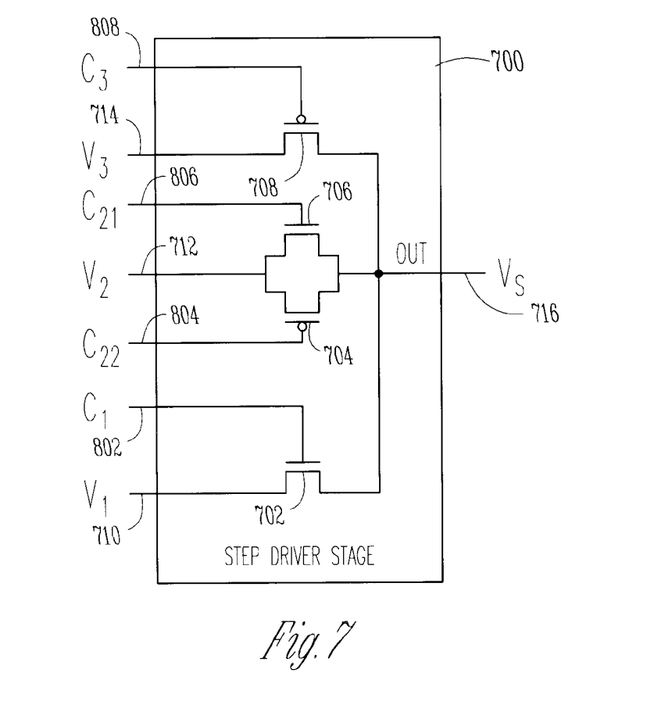
FIG. 7 is a simplified functional block diagram of a step driver stage in accordance with another embodiment of the present invention.
Figure 8:
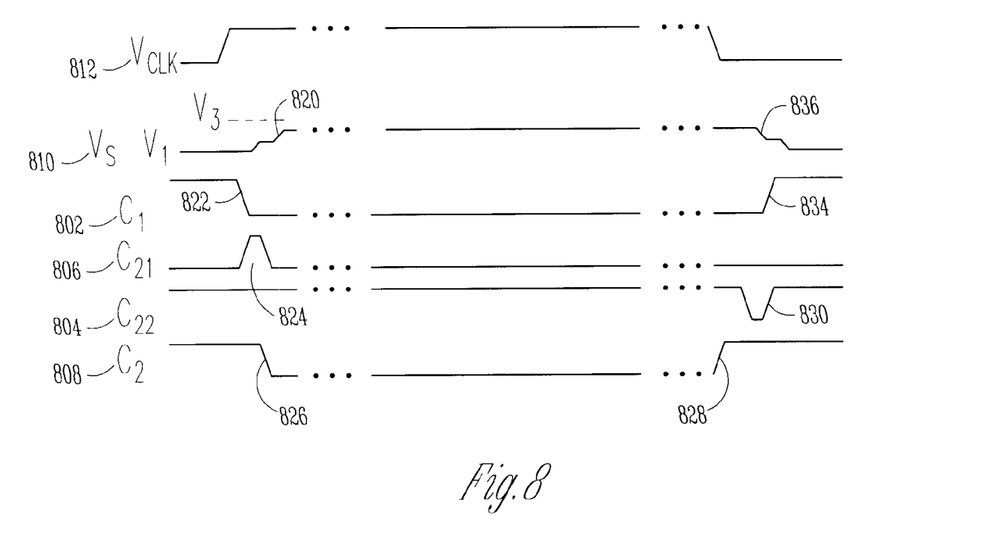
FIG. 8 illustrates signals for the step driver stage of FIG. 7.

FIG. 7 is a simplified functional block diagram of a step driver stage in accordance with another embodiment of the present invention. FIG. 8 illustrates signals for the step driver stage of FIG. 7. Step driver stage 700 is suitable for use as one of step driver stages 106 (FIG. 1) or as one of step driver stages 206 (FIG. 2). Step driver stage 700 may generate a stepped switching signal for one or more of the switching elements of a power converter. Step driver stage 700 may be comprised of several step-driver switching elements 702, 704, 706 and 708 arranged to sequentially couple one of several input stepped voltages 710, 712 and 714 to step driver stage output 716 generating the stepped output signal Vs. Control signals 802, 804, 806 and 808 (illustrated respectively as C1, C22, C21 and C3) turn on and off corresponding switching elements 702, 704, 706 and 708. A predriver stage, such as predriver stage 108 (FIG. 1) or predriver stage 208 (FIG. 2) may generate the control signals and the stepped voltages. Stepped voltages 710, 712 and 714 may range from Vref to Vin. Step driver stage 700 may be referred to as an adiabatic buffer.

To generate upward transition 820 of stepped switching signal 810 (i.e., from V1 to V3), control signal 802 (C1) turns off switching element 702 at transition 822, control signal 806 (C21) turns on switching element 706 at times 824, and then control signal 808 (C3) turns on switching element 708 at transition 826. To generate downward transition 836 of stepped switching signal 810 (i.e., from V3 to V1), control signal 808 (C3) turns off switching element 708 at transition 828, control signal 804 (C22) turns on switching elements 704 during time 830, and then control signal 802 (C1) turns on switching element 702 at transition 834. In the example illustrated, downward transition 822 of control signal 802 and upward transition 828 of control signal 808 may be responsive to the transitions of clock signal 812 received by the predriver stage.

In the embodiment illustrated in FIG. 7, switching elements 702 and 706 may be N-channel MOSFETs, and switching elements 704 and 708 may be a P-channel MOSFETs, however other combinations of N-channel and P-channel MOSFETs may also be suitable. Other types of switching transistors may be suitable for use as the switching elements. Switching elements 704 and 706 together operate to help equalize the rise and fall times of stepped switching signal 810. Step driver stage 700 may include additional switching elements for generating additional steps for the upward and downward transitions of switching signal 810. Although switching elements 704 and 706 are coupled back-to-back similar to a transmission gate, switching elements 704 and 706 do not comprise a transmission gate because the gates are not controlled by inverse signals.

Figure 9:
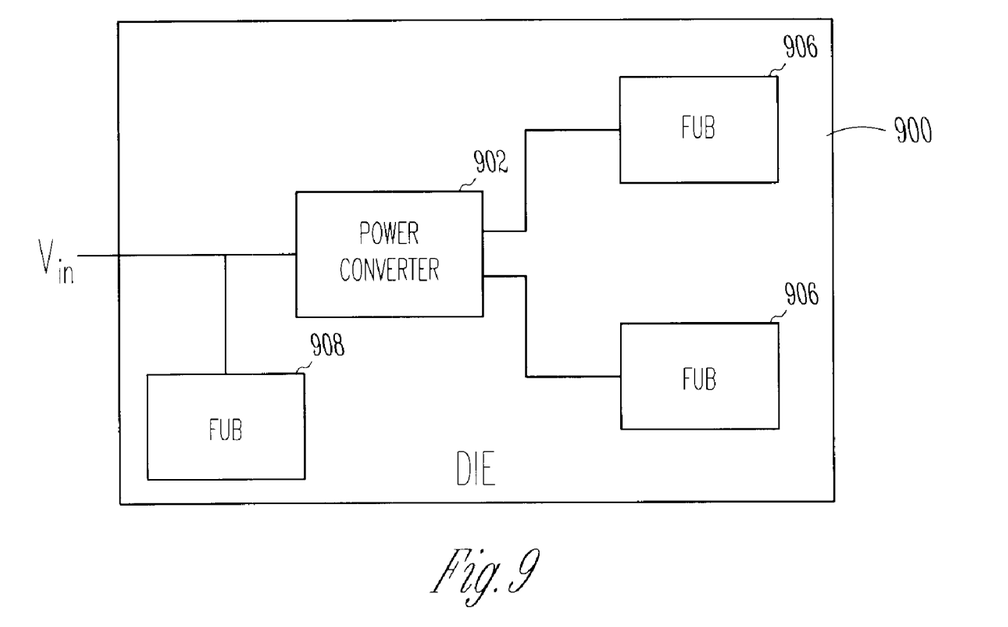
FIG. 9 illustrates a die in accordance with an embodiment of the present invention.

FIG. 9 illustrates a die in accordance with an embodiment of the present invention. Semiconductor die 900 includes on-die power converter 902 which receives an input voltage, for example, from off-die voltage regulation module to generate an output voltage for one or more functional unit blocks (FUBs) 906. An FUB may be an element fabricated on semiconductor die 900 and may include, for example, a memory, a cache, a register file, a scheduler, a multiplier, an adder, a shifter, an ALU, I/O, a microprocessor, etc. Power converter 902 may be similar to power converter 100 (FIG. 1) or power converter 200 (FIG. 2) and may be fabricated on die 900 using, for example, a CMOS process. In this embodiment, a power converter 902 may provide a lower output voltage allowing a higher voltage to the die reducing the current flowing to the die. This, for example, improves interconnect reliability and reduces the parasitic effects of the current path to the die.

In one embodiment of the present invention, semiconductor die 900 may also include critical path FUBs 908 which receive input power directly from a VRM or other sources. The present invention allows power converter 902 to generate separate voltages for FUBs 906, and may allow a lower output voltage for FUBs 906 when power conservation is desired. In this embodiment, FUBs 906 may be non-critical path FUBs. Power consumption has become a major bottleneck of current and future microprocessors. Multiple supply voltages on die may reduce power consumption. Non-critical FUBs may still meet speed requirements even if operated at a reduced supply voltage. Although it may not be desirable to reduce supply voltage of the whole die because it may low down the critical path, a second lower supply voltage for non-critical FUBs may reduce power consumption with little penalty on performance.

The on-die power converter of the present invention may be used to generate the second supply voltage directly on the die. Conversion efficiency of the power converter determines how much power is actually saved. Switch-mode power converters (e.g. those utilizing a switched-capacitor and switched-inductor topology) may achieve power efficiency close to 100%, however internal losses of a switching power converter may limit efficiency to less than 100%. Power loss comes from charging and discharging of the switching elements with capacitive gate control inputs (e.g., MOSFETS) at high frequency. The power converter in accordance with the various embodiments of the present invention, include adiabatic buffers which reduce power losses associated with charging and discharging of the gate terminals of the switching elements, thereby improving efficiency of the power converter and reducing power consumption of a semiconductor die. Higher efficiency is especially important when a switching converter is used for multiple on-die supply voltage applications.

The low-power adiabatic buffer topology described herein for charging and discharging the gate capacitance of MOSFET switches, such as the switching elements of a switched-capacitor or switched-inductor power converter leads to power savings. Although an adiabatic transition may take longer time than charging and discharging by an inverter buffer, this time penalty may be outweighed by the reduction in power consumption. The embodiments of the present invention that achieve substantially equal rise and fall times of the stepped switching signals further enhance power converter efficiency. One advantage to equalizing the rise and fall times is that in fast operation, the charging and discharging of the load (such as the MOSFET switches) to the intermediate levels may be incomplete. If the transition times are not substantially equal, the intermediate voltage level may shift from a more optimum value in the direction of the faster transition, and benefits from adiabatic charging may diminish.

When driving capacitive loads, some power is consumed by the buffer itself and additional power is consumed by the capacitive load. An adiabatic buffer switching in (N−1) steps (i.e., utilizing N progressively increasing voltage levels) may reduce load power by a factor of 1/(N−1). However, N−1 step adiabatic charging may take approximately N−1 times longer time than charging in a single step, such as by an inverting buffer. For power converter applications this time penalty may be acceptable because of the reduced power losses. Reducing the size of the inverting buffer may not be as efficient when the majority of the capacitive load comes from the driven switching device, such as devices 110 (FIG. 1) and not from the driver.

Several power converters of the present invention may be combined to form an on-die multiphase power converter. In this embodiment, each power converter may receive a phase-shifted clock signal, and their outputs may be combined. Each power converter may draw input current during a first portion of the clock cycle, and may generate current during a second portion of the clock cycle. Because each clock signal generated for the power converters is shifted in phase, the current drawn by each successive power converter is also shifted in phase, allowing the combination of power converters to draw a more level input current over an entire clock cycle and to generate a more level output voltage over the clock cycle. When the multiphase power converter includes N power converters and the clock signal has a period (T), each phase-shifted clock signal may be shifted in phase by an amount substantially equal to T/N. The number N of individual power converters may range from two up to a hundred or more, although less than ten individual power converters may be suitable for many applications.

The present invention also provides a buffer to generate a stepped switching signal. The buffer includes a first switching element to couple a negative voltage to an output, a second and third switching elements, and a fourth switching element to couple a positive voltage to the output. The second switching element turns on during a downward transition of the stepped switching signal to couple an interim voltage to the output, and the third switching element turns on during an upward transition of the stepped switching signal to couple the interim voltage to the output. In one embodiment of the buffer, the fourth switching element may be a P-channel MOSFET, and the first, second and third switching elements may be N-channel MOSFETs. In this embodiment, the third switching element also turns on during the downward transition of the stepped switching signal to decrease a fall time of the downward transition. In alternate embodiment of the buffer, the first and third switching elements may be N-channel MOSFETs and the second and fourth switching elements may be P-channel MOSFETs. In a second alternate embodiment, the second, third and fourth switching elements may be P-channel MOSFETs, and the first switching element is an N-channel MOSFET. In this second alternate embodiment, the second switching element also turns on during the upward transition of the stepped switching signal to decrease a rise time of the upward transition.

In one embodiment, the present invention includes a method of designing a step driver stage for a switching power converter. The step driver stage designed in this embodiment may be used, for example, as step driver stages 500 (FIG. 5) or 700 (FIG. 7). The method includes defining a number N of stepped voltage levels where N is greater than 2. The method also includes defining the stepped voltage levels (V1, V2, . . . , VN) so that the difference between any two successive levels is substantially the same. There are (1+2*(N-2)+1) possible one-step transitions of output Vs. One transition to V1, two transitions for each of V2, . . . , VN-1, and one transition to VN. The method also includes defining a time allocated for each one-step transition for given capacitive load. For each one-step transition, the method includes selecting a switching device type and size which meets the allocated time and consumes a least amount of power during operation. For example, P-channel and N-channel MOSFETs may be considered and the device which meets the allocated transition time at smaller gate area would be selected. After this process is completed, (1+2*(N-2)+1) transistors can be obtained possibly of various types and sizes which are optimal for each transition. The method also includes downsizing a device. For each of voltage levels V2, . . . , VN-1, consider the two devices coupling VS during the two opposite transitions. If the selected device types are not identical (e.g., P-channel and N-channel MOSFETs), then no downsizing is necessary. If the types are identical (e.g., both are N-channel MOSFETs), then denote A the smaller and B the larger of the selected sizes. Device of size B may be downsized to B-A, and during one transition, only device A is operated. During the second transition, both devices of size A and B-A are operated in parallel. This results in a total device of size B. In this way, chip area can be saved by implementing devices of size A and B-A (total size B) instead of total size A+B.

Thus, an improved power converter suitable for on-die fabrication has been described. Improved efficiency is achieved using adiabatic buffers to drive MOSFET switching elements with stepped switching signals. In some embodiments, substantially equal rise and fall times are achieved. An improved adiabatic buffer has also be described that achieves substantially equal rise and fall times.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A switching power converter comprising:
 a driver portion to generate stepped switching signals, each stepped switching signal including at least one interim step between an initial state and a final state of a step; and
 a switching portion to generate an output voltage in response to the stepped switching signals.

2. A switching power converter comprising:
 a driver portion to generate stepped switching signals; and
 a switching portion to generate an output voltage in response to the stepped switching signals, wherein the driver portion has at least one step driver stage comprised of step driver switching elements sequentially activated by control signals to generate one of the stepped switching signals.

3. The power converter as claimed in claim 2 wherein one of the step driver switching elements includes first and second switching transistors coupled back-to-back, the first switching transistor activated to generate a portion of an upward transition of the one stepped switching signal, the second switching transistor activated to generate a portion of a downward transition of the one stepped switching signal.

4. The power converter as claimed in claim 3 wherein the first switching transistor is an N-channel MOSFET and the second transistor is a P-channel MOSFET.

5. The power converter as claimed in claim 3 wherein the first switching transistor is also activated to generate the portion of the downward transition of the one stepped switching signal.

6. The power converter as claimed in claim 5 wherein the first and second switching transistors are both N-channel MOSFETs.

7. The power converter of claim 2 wherein the driver portion also has a predriver stage to generate the control signals for each of the step driver switching elements.

8. The power converter as claimed in claim 7 wherein in response to the control signals, the step driver switching elements sequentially couple input stepped voltages to generate the stepped switching signal.

9. A switching power converter comprising:
   a driver portion to generate stepped switching signals, each stepped switching signal including at least one interim step between an initial state and a final state of a step; and
   a switching portion to generate an output voltage in response to the stepped switching signals, wherein the switching portion is comprised of a plurality of switching elements and the driver portion is comprised of a plurality of step driver stages, wherein each switching element receives one of the stepped switching signals from a corresponding step driver stage.

10. The power converter as claimed in claim 9 wherein the switching elements of the switching portion include MOSFET switches.

11. The power converter as claimed in claim 9 wherein the switching portion further includes a capacitive energy storage element, the switching elements providing energy to and removing energy from the capacitive energy storage element in response to the stepped switching signals.

12. The power converter as claimed in claim 9 wherein the switching portion further includes an inductive energy storage element, the switching elements providing energy to and removing energy from the inductive energy storage element in response to the stepped switching signals.

13. A switching power converter comprising:
   a driver portion to generate stepped switching signals; and
   a switching portion to generate an output voltage in response to the stepped switching signals,
   wherein the switching portion is comprised of a plurality of switching elements and the driver portion is comprised of a plurality of step driver stages, wherein each switching element receives one of the stepped switching signals from a corresponding step driver stage, and
   wherein at least one of the step driver stages includes MOSFET switches to sequentially couple stepped voltages to generate one of the stepped switching signals for one of the switching elements of the switching portion.

14. A semiconductor die comprising:
   an on-die power converter; and
   at least one functional unit block to receive power from the on-die power converter,
   wherein the on-die power converter includes a driver portion to generate stepped switching signals, each stepped switching signal including at least one interim step between an initial state and a final state of a step, and a switching portion to generate an output voltage for the at least one functional unit block in response to the stepped switching signals.

15. A semiconductor die comprising:
   an on-die power converter; and
   at least one functional unit block to receive power from the on-die power converter,
   wherein the on-die power converter includes a driver portion to generate stepped switching signals, and a switching portion to generate an output voltage for the at least one functional unit block in response to the stepped switching signals,
   wherein the driver portion has at least one step driver stage comprised of step driver switching elements sequentially activated by control signals to generate one of the stepped switching signals.

16. The semiconductor die as claimed in claim 15 wherein one of the step driver switching elements of the step driver stage includes first and second switching transistors coupled back-to-back, the first switching transistor activated to generate a portion of an upward transition of the one stepped switching signal, the second switching transistor activated to generate a portion of a downward transition of the one stepped switching signal.

17. The semiconductor die as claimed in claim 16 wherein the first switching transistor is also activated to generate the portion of the downward transition of the one stepped switching signal, and wherein the first and second switching transistors are both N-channel MOSFETs.

18. The semiconductor die as claimed in claim 16 further comprising at least a second functional unit block to receive power from another source.

19. The semiconductor die as claimed in claim 18 wherein the power converter reduces the voltage to the at least one functional unit block during a power conservation mode while the second functional unit block continues to receive power from the another source.

20. A buffer to generate a stepped switching signal comprising:
   a first switching element to couple a lowest voltage of the stepped switching signal to an output;
   second and third switching elements coupled back-to-back; and
   a fourth switching element to couple a highest voltage of the stepped switching signal to the output,
   wherein the second switching element turns on during a downward transition of the stepped switching signal to couple an interim voltage to the output, and the third switching element turns on during an upward transition of the stepped switching signal to couple the interim voltage to the output.

21. The buffer of claim 20 wherein the fourth switching element is a P-channel MOSFET, and the first, second and third switching elements are N-channel MOSFETs, and wherein the third switching element also turns on during the downward transition of the stepped switching signal to decrease a fall time of the downward transition to substantially equalize the fall and rise times of the stepped switching signal.

22. The buffer of claim 20 wherein the first and third switching elements are N-channel MOSFETs and the second and fourth switching elements are P-channel MOSFETs.

23. The buffer of claim 20 wherein the second, third and fourth switching elements are P-channel MOSFETs, and the first switching element is an N-channel MOSFET, and wherein the second switching element also turns on during the upward transition of the stepped switching signal to decrease a rise time of the upward transition to substantially equalize the rise and fall times of the stepped switching signal.

* * * * *

UNITED STATES PATENT AND TRADEMARK OFFICE
CERTIFICATE OF CORRECTION

PATENT NO. : 6,559,492 B1
DATED : May 6, 2003
INVENTOR(S) : Peter Hazucha and Atila Alvandpour It is certified that error appears in the above-identified patent and that said Letters Patent is hereby corrected as shown below:

<u>Title page,</u>
Item [56, References Cited, U.S. PATENT DOCUMENTS, delete "307/711" and insert -- 307/11 -- therefor.

Signed and Sealed this

Third Day of August, 2004

JON W. DUDAS
*Acting Director of the United States Patent and Trademark Office*